(12) United States Patent
Yu et al.

(10) Patent No.: US 10,015,059 B2
(45) Date of Patent: *Jul. 3, 2018

(54) EXPONENTIAL MOVING MAXIMUM (EMM) FILTER FOR PREDICTIVE ANALYTICS IN NETWORK REPORTING

(71) Applicant: Infoblox Inc., Santa Clara, CA (US)

(72) Inventors: Bin Yu, Pleasanton, CA (US); Les Smith, Pleasanton, CA (US); Mark Threefoot, Sunnyvale, CA (US)

(73) Assignee: Infoblox Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/423,118

(22) Filed: Feb. 2, 2017

(65) Prior Publication Data

US 2017/0149622 A1 May 25, 2017

Related U.S. Application Data

(63) Continuation of application No. 14/689,823, filed on Apr. 17, 2015, now Pat. No. 9,602,462.

(60) Provisional application No. 62/048,971, filed on Sep. 11, 2014.

(51) Int. Cl.
*H04L 12/26* (2006.01)
*H04L 12/24* (2006.01)
*H04L 29/12* (2006.01)

(52) U.S. Cl.
CPC ........ *H04L 41/147* (2013.01); *H04L 41/0604* (2013.01); *H04L 41/142* (2013.01); *H04L 43/045* (2013.01); *H04L 61/1511* (2013.01)

(58) Field of Classification Search
None
See application file for complete search history.

(56) References Cited

U.S. PATENT DOCUMENTS

| 7,668,096 | B2 | 2/2010 | Ignatowski |
| 9,602,462 | B2 * | 3/2017 | Yu .......................... H04L 41/147 |
| 2005/0003827 | A1 | 1/2005 | Whelan |
| 2013/0268357 | A1 | 10/2013 | Heath |

(Continued)

FOREIGN PATENT DOCUMENTS

| CN | 103546335 | 1/2014 |
| EP | 1316079 | 6/2003 |

(Continued)

OTHER PUBLICATIONS

Asteriou et al., Applied Econometrics, Second Edition, Palgrave Macmillan, Chapter 13, ARIMA Models and the Box—Jenkins Methodology, pp. 265-286, 2011.

(Continued)

*Primary Examiner* — Chi H Pham
*Assistant Examiner* — Shick Hom
(74) *Attorney, Agent, or Firm* — Van Pelt, Yi & James LLP

(57) ABSTRACT

Techniques for an exponential moving maximum (EMM) filter for predictive analytics in network reporting are disclosed. In some embodiments, a process for predictive analytics in network reporting using an EMM filter includes pre-processing network-related data by performing exponential moving maximum (EMM) filtering on the network-related data; and determining predictive analytics based on the EMM filtered network-related data.

20 Claims, 13 Drawing Sheets

(56) References Cited

U.S. PATENT DOCUMENTS

2014/0280679 A1    9/2014  Dey
2014/0310714 A1*  10/2014  Chan ................. G06F 17/30598
                                                                         718/102
2015/0317197 A1    11/2015  Blair

FOREIGN PATENT DOCUMENTS

WO        2002001532      1/2002
WO        2009004661      1/2009

OTHER PUBLICATIONS

Author Unknown, Splunk, Splunk Enterprise 6.0.1, Search Reference, Mar. 3, 2014.
Lee et al., Application of Subset Autoregressive Integrated Moving Average Model for Short-Term Freeway Traffic Volume Forecasting, Transportation Research Record: Journal of.
Papadopouli et al., Evaluation of Short-Term Traffic Forecasting Algorithms in Wireless Networks, Next Generation Internet Design and Engineering, 2006, NGI'06 2006 2nd Confer.
Papagiannaki et al., Long-Term Forecasting of Internet Backbone Traffic: Observations and Initial Models, Neural Networks, IEEE Transactions on 16.5, 2005, pp. 1110-1124.
Robert G. Brown, Exponential Smoothing for Predicting Demand, pp. 1-14, Jan. 1957.
Sang et al., A Predictability Analysis of Network Traffic, 2002, pp. 329-345.

* cited by examiner

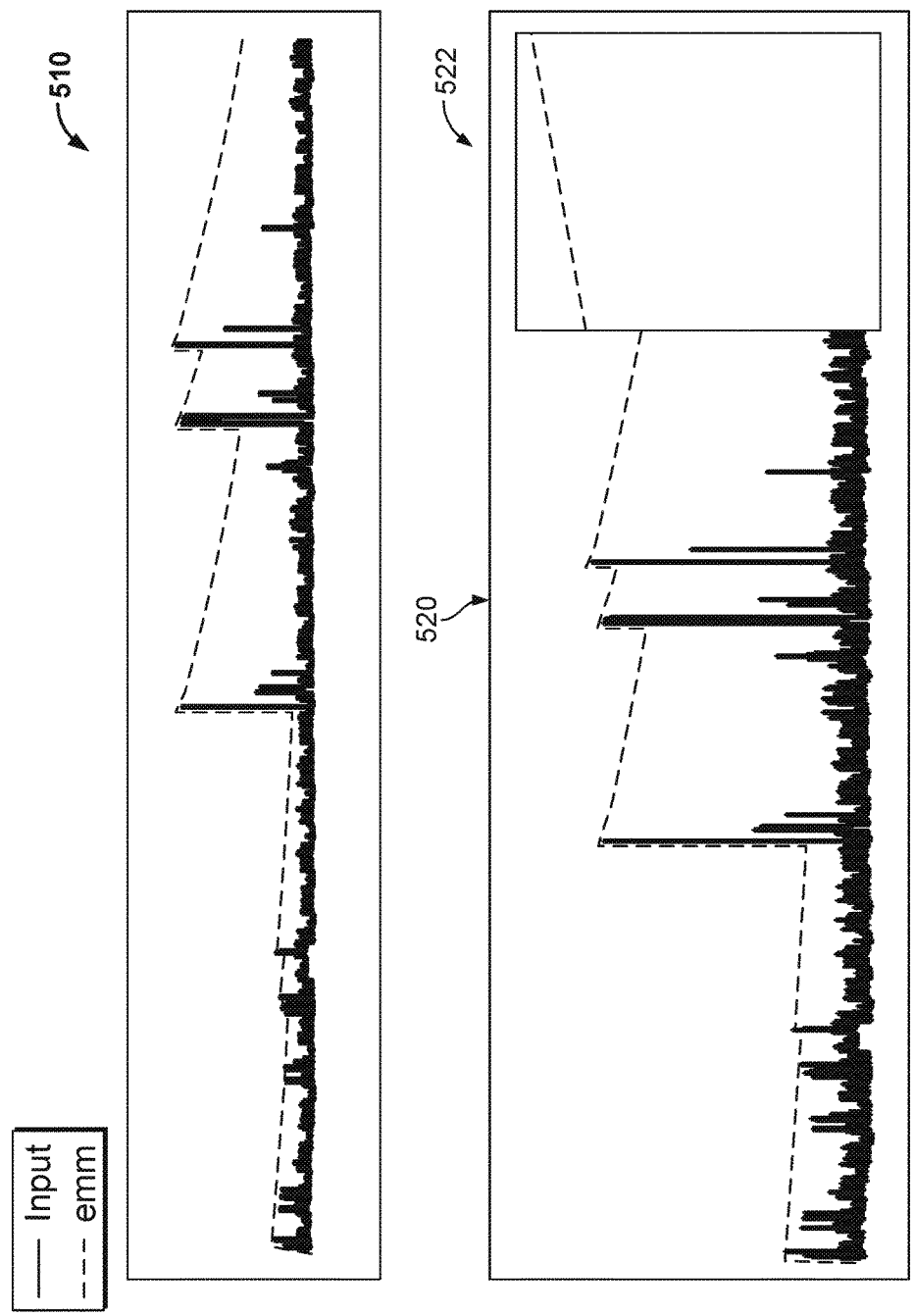

US 10,015,059 B2

EXPONENTIAL MOVING MAXIMUM (EMM) FILTER FOR PREDICTIVE ANALYTICS IN NETWORK REPORTING

CROSS REFERENCE TO OTHER APPLICATIONS

This application is a continuation of co-pending U.S. patent application Ser. No. 14/689,823, entitled EXPONENTIAL MOVING MAXIMUM (EMM) FILTER FOR PREDICTIVE ANALYTICS IN NETWORK REPORTING filed Apr. 17, 2015 which is incorporated herein by reference for all purposes, which claims priority to U.S. Provisional Patent Application No. 62/048,971, entitled EXPONENTIAL MOVING MAXIMUM (EMM) FILTER FOR PREDICTIVE ANALYTICS IN NETWORK REPORTING, filed Sep. 11, 2014, which is incorporated herein by reference for all purposes.

BACKGROUND OF THE INVENTION

Predictive analytics generally refers to techniques for analyzing historical and/or current data corresponding to one or more events to formulate predictions about future events based on historical and/or current data. For example, predictive analytics can apply various statistical and/or analytical techniques from data mining, modeling, regression, and/or machine learning techniques to analyze data in order to make predictions based on historical and/or current data.

BRIEF DESCRIPTION OF THE DRAWINGS

Various embodiments of the invention are disclosed in the following detailed description and the accompanying drawings.

FIG. 5B shows charts illustrating an example of EMM filtering applied to time series data for DNS queries and trend prediction performed on the EMM filtered time series data in accordance with some embodiments.

DETAILED DESCRIPTION

Figure 1:
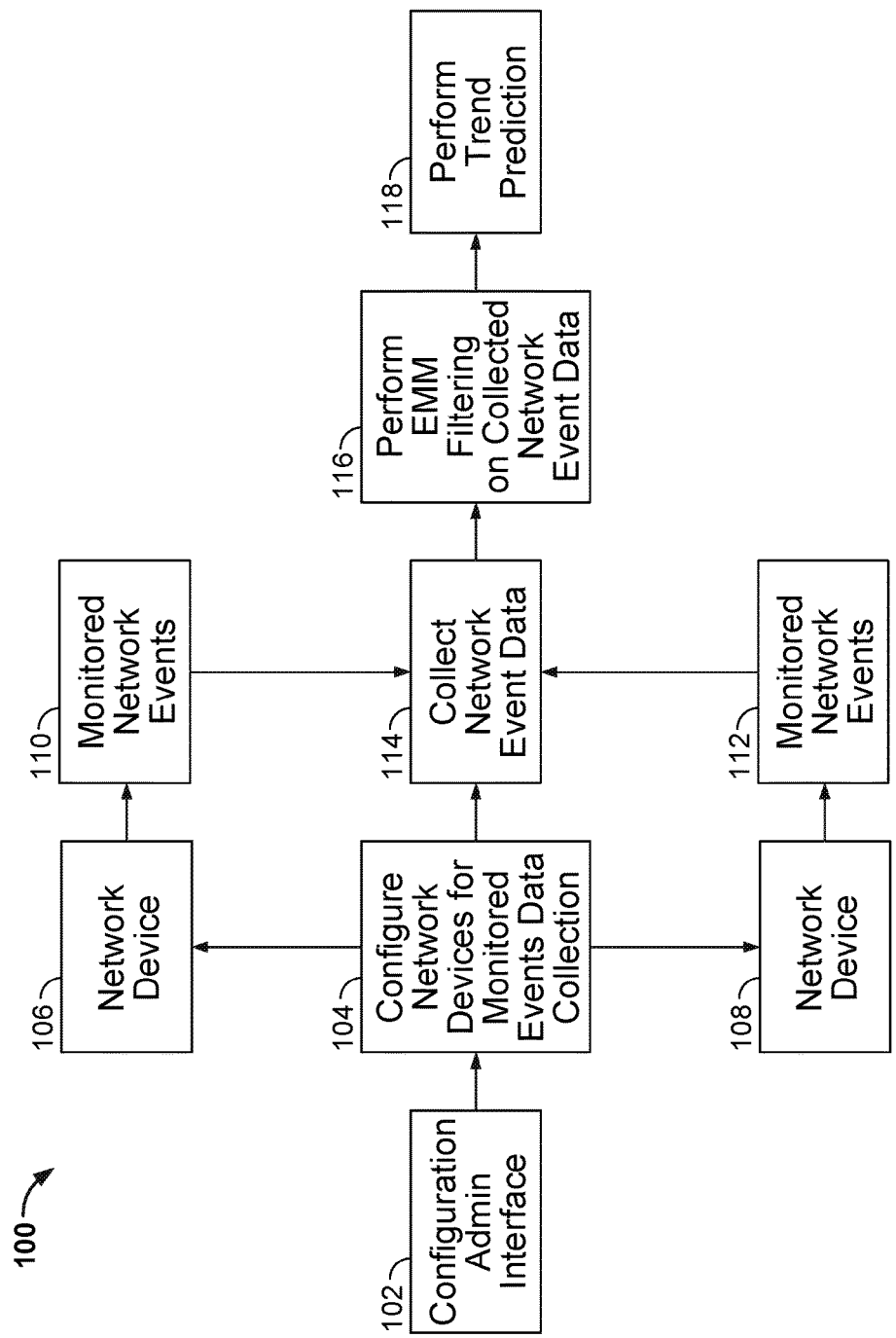
FIG. 1 is an activity diagram of a system for predictive analytics in network reporting using an Exponential Moving Maximum (EMM) filter in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Predictive analytics generally refers to techniques for analyzing historical and/or current data corresponding to one or more events to formulate predictions about future events based on historical and/or current data. For example, predictive analytics can apply various statistical and/or analytical techniques from data mining, modeling, regression, and/or machine learning techniques to analyze data in order to make predictions based on historical and/or current data.

Predictive analytics can be applied to technology fields, such as network reporting. Network reporting tools exist to provide various event, alert, historical, and predictive reporting for data communication networks, such as computer networks. For example, network reporting tools can be used to provide operational information for monitoring a computer network (e.g., an enterprise network) including events, faults, capacity, and/or other aspects associated with network infrastructure including devices associated with the network (e.g., Domain Name Server (DNS) servers/appliances, routers, switches, security devices/appliances, etc.).

Existing network reporting tools generally apply basic prediction algorithms. Basic prediction algorithms include, for example, linear extrapolation, quadratic filter, Kalman filter, and seasonality estimation.

However, existing network reporting tools fail to adequately perform trend prediction.

Thus, there is a need for new and improved techniques for predictive analytics in network reporting.

Overview of Techniques for an Exponential Moving Maximum (EMM) Filter for Predictive Analytics for Network Reporting An important area in predictive analytics is trend prediction or forecast. Trend prediction can be used to provide a moving trend for future based on what has happened such as based on historical and/or current data. For example, trend prediction for peak resource usages can be used by information technology (IT) departments to facilitate effective budgeting and IT hardware preparation for an IT data center (e.g., capacity planning and requirements for an enterprise network infrastructure).

However, unlike other real world data that generally embeds strong trend data though covered by some fluctuations, peak resource usage data by nature often does not fall into a regular trend. Therefore, traditional predictive analytics techniques generally do not perform well in prediction analytics when the data includes such irregular data (e.g., data that includes such fluctuations, such as peak resource usage data for network resource usage).

Accordingly, new and improved techniques for predictive analytics in network reporting are disclosed.

In one embodiment, techniques for predictive analytics in network reporting that implement an exponential moving maximum (EMM) filter are disclosed. For example, the disclosed new filtering technique (e.g., an EMM filter) can be applied to data that includes irregular data (e.g., data that includes significant fluctuations), such as in peak resource usage data for an IT data center, such as further described below.

For example, transaction can be used as a conceptual term to generally refer to an event that occurred on a network, a database, or some other IT-related event. In this example, a typical measure can be a number of transactions per second (TPS) or over some other time frame. A peak value is the maximum value of TPS over the timespan of interest. For instance, an hourly peak value is the maximum TPS for each hour. Unlike some other statistic compositions, such as average or total volume value, peak values may not fall into a trend at lower granularity levels.

In some cases, hourly peak values may be greatly fluctuated rather than smoothly trended. However, when the view of such data is zoomed out to higher granularity levels, such as daily, weekly, or monthly, the data, in many cases, can reveal trends. That is because the time frame boundaries can often play a role that affects the smoothness or trend formation at a given granularity level, which is generally referred to herein as the time frame boundary effect. In order to overcome this time frame boundary effect, an EMM filter is disclosed as further described below.

In one embodiment, the EMM filter can be defined as $$y_0 = x_0,$$

$$y_k = \max_{0 \le i \le k} \{\alpha^{\frac{i}{w}} x_{k-i}\},$$

where $\alpha \in [0, 1.0]$ is an inheritance parameter and w is a filtering window size. For example, when $\alpha=0$, $y_k=x_k$, input itself; $\alpha=1$, $y_k=\max(x_k, y_{k-1})$, a simple rising trend is provided. In general, $$y_k = \alpha^{\frac{m}{w}} x_{k-m},$$

given $y_{k-m}$ is the latest bubble point. In particular, a data point is referred to herein as a bubble point when its contribution dominates on the following data point until a next bubble point. As a result, the effect of an EMM filtering can smooth a data series while maintaining local maximum values (e.g., smoothing a data series without losing local maximum/peak values). The EMM filter is further described below with respect to various embodiments for providing predictive analytics in network reporting using an EMM filter.

In some embodiments, a system for predictive analytics in network reporting using an EMM filter includes a processor configured to pre-process network-related data by performing exponential moving maximum (EMM) filtering on the network-related data; and determine predictive analytics based on the EMM filtered network-related data; and a memory coupled to the processor and configured to provide the processor with instructions.

For example, a trend prediction can be generated based on the EMM filtered network-related data, and a visualization (e.g., graph, chart, report, etc.) can be generated to display the trend prediction. In some cases, the network-related data includes monitored network events data. For example, the network-related data includes DNS data (e.g., DNS query and DNS response data).

In one embodiment, the network-related data is received and/or collected from one or more network devices. For example, DNS data can be collected from an agent executed on a DNS appliance. The received/collected network-related data can be stored in a data store for aggregation and analysis, such as further described below.

In some embodiments, a process for predictive analytics in network reporting using an EMM filter includes pre-processing network-related data by performing exponential moving maximum (EMM) filtering on the network-related data; and determining predictive analytics based on the EMM filtered network-related data.

In some embodiments, a computer program product for predictive analytics in network reporting using an EMM filter includes pre-processing network-related data by performing exponential moving maximum (EMM) filtering on the network-related data; and determining predictive analytics based on the EMM filtered network-related data.

Generally, DNS and Dynamic Host Configuration Protocol (DHCP) are common network services deployed in the network infrastructure for a variety of organizations (e.g., a significant amount of network traffic on enterprise networks utilizes DNS and/or DHCP network services). DNS appliances can provide these DNS and DHCP network services for enterprise networks (e.g., DNS appliances are commercially available from Infoblox Inc. and/or other vendors). A DNS appliance that provides these DNS and DHCP network services often also includes or is integrated/compatible with a network reporting system/software. For example, the network reporting system/software can provide summarized reports and/or visual/graphical representations of information about the system status, resource usage, performance metrics, and/or monitored network data trends (e.g., DNS/DHCP network data trends). Furthermore, it can be desirable and important to provide predictions (e.g., trend predictions) based on monitored network data measurements so that users (e.g., IT/network admin/managers) can be well prepared for what is going to happen to prevent downtime, such as to facilitate improved capacity planning for the network infrastructure of the organization. Among the predictive measures, there are many that reflect peak or maximum values, such as peak volume or resource usage. For example, a peak value prediction can be useful for the IT managers to ensure its organization is ahead of the cycles in terms of the network capacity. There are existing approaches for trend prediction of time series data. However, as similarly discussed above, peak values often do not fall into a trend by nature. As a result, traditional trend prediction approaches do not perform well when applied to this type of data. Accordingly, as further described herein, a filtering technique referred to herein as exponential moving maximum (EMM) filtering is disclosed. The disclosed EMM filtering technique can be applied before applying a prediction algorithm on peak time series data. As also described below, various results based on DNS-related time series data are provided for comparison of predictive analytics in network reporting performed using an EMM filter and without using the EMM filter.

In an example use case scenario, the disclosed techniques for predictive analytics in network reporting using an EMM filter can be implemented in a network reporting tool, such as provided by a network reporting software product and/or appliance (e.g., such as the Infoblox Reporting solutions/appliances commercially available from Infoblox Inc. and/or other network reporting related products/services from other vendors, such as other network reporting platforms available from Splunk Corporation and/or similar network reporting platforms available from other vendors or open source projects). For example, the disclosed techniques for predictive analytics in network reporting using an EMM filter can be implemented in a network reporting tool to perform enhanced trend prediction, such as in peak resource usage data for an IT data center, such as further described below.

In another example use case scenario, the disclosed techniques for predictive analytics in network reporting using an EMM filter can be implemented as an EMM plug-in that can be configured to be a compatible plug-in for one or more network reporting tools, such as provided by a network reporting tool software product and/or appliance (e.g., such as the Infoblox Reporting solutions/appliances commercially available from Infoblox Inc. and/or other network reporting related products/services from other vendors, such as other network reporting platforms available from Splunk Corporation and/or similar network reporting platforms available from other vendors or open source projects). For example, the EMM plug-in can be provided as a commercially available and/or open source plug-in for various network reporting tools, such as further described below.

In yet another example use case scenario, the disclosed techniques for predictive analytics in network reporting using an EMM filter can be applied to DNS-related network data (e.g., DNS query data, DHCP lease data, etc.) that can facilitate various opportunities when applied to such historical and/or current DNS-related network data using various disclosed analytical techniques as further described herein.

The predictive analytics in network reporting using an EMM filter applied to DNS-related network data can facilitate identification of various network usage patterns to cope with changing demands. The predictive analytics in network reporting using an EMM filter applied to DNS-related network data can also facilitate prediction of time potential bottlenecks in a complex network deployment (e.g., an enterprise network). The predictive analytics in network reporting using an EMM filter applied to DNS-related network data can also facilitate IT/network management for an enterprise network (e.g., to help maintain overall network availability). The predictive analytics in network reporting using an EMM filter applied to DNS-related network data can also assist in IT/network capacity and usage planning (e.g., to improve capacity planning).

As further described below, an EMM filter is disclosed to provide new and improved preprocessing techniques that can preserve local maximum values from the historical/current time series data to facilitate more accurate prediction for network reporting. In an example implementation, an EMM filter is implemented as an EMM plug-in for a network reporting platform (e.g., the commercially available Splunk platform and/or another network reporting platform). As further described below, independent of any prediction function to perform trend prediction on the (pre-processed) time series data, the disclosed EMM filter can provide improved performance on non-stationary data with any prediction function(s)/technique(s).

As further described below, these and various other features and techniques are disclosed for predictive analytics in network reporting using an EMM filter.

System Architecture for Providing an Exponential Moving Maximum (EMM) Filter for Predictive Analytics for Network Reporting FIG. 1 is an activity diagram of a system for predictive analytics in network reporting using an Exponential Moving Maximum (EMM) filter in accordance with some embodiments. In one embodiment, a network reporting system (e.g., an application or component of the network reporting system, another network reporting system/application, and/or a network device, such as further described herein) receives network event data (e.g., collected/received from one or more network devices, such as Domain Name Server (DNS) devices and/or other network devices, such as Software-Defined Networking (SDN) or physical network devices, on an enterprise network). The network reporting system filters the network event data, such as using the EMM filter disclosed herein. The network reporting system analyzes the filtered network event data to perform trend prediction. In an example implementation, the network reporting system generates a report and/or a graphical representation (e.g., graphical visualization, such as a graph or chart) of the trend prediction(s) based on the filtered network event data, such as further described below.

In one embodiment, the network reporting system, which can be, for example, integrated with a reporting tool/platform on which such applications and/or plug-ins can execute, such as similarly described herein, includes a graphical user interface (GUI) to represent the trend prediction(s) based on the filtered network event data. For example, the GUI of the network application can provide new insights to an IT/network admin/manager by providing a report(s) and/or a graphical representation(s) (e.g., graphical visualization, such as a graph or chart) of the trend prediction(s) based on the filtered network event data, such as further described below. As such, the network reporting system is a tool for an IT/network admin/manager that provides new and improved predictions (e.g., trend predictions) based on monitored network data measurements (e.g., DNS-related time series data and/or other network measurements). For instance, the disclosed network reporting system can facilitate improved capacity planning for the network infrastructure of the organization, such as further described below.

Referring to FIG. 1, an activity diagram 100 of a system for predictive analytics in network reporting using an EMM filter initiates at 102 with a network/IT admin for a network (e.g., an enterprise network) using a configuration admin interface (e.g., of the network reporting system or of a console/management interface for the network devices) to perform a configuration of network devices (e.g., Domain Name Server (DNS) devices and/or other network devices, such as Software-Defined Networking (SDN) or physical network devices) in the network (e.g., the enterprise network) at 104. For example, the configuration can include identifying and/or configuring network devices in the network (e.g., the enterprise network) from which to collect event data (e.g., to receive DNS response log data from such DNS devices, so that the desired DNS response log data can be pushed or pulled for such collection, and/or tapping network/DNS data from SDN/virtual network devices such as OpenFlow switches). The network devices at 106 and 108 provide monitored network event data at 110 and 112 (e.g., DNS response data and/or other network event data monitored by the network devices on the enterprise network). The network reporting system collects the monitored network event data at 114. The network reporting system filters the monitored network event data using an EMM filter at 116. In an example implementation, positive DNS responses can serve as a basic and reliable indicator for interactions between endpoints (e.g., in most networks, DNS responses are indicative of a significant portion of interactions between endpoints, such as sessions or other connections that indicate interactions between endpoints). The network reporting system performs trend prediction on the filtered network event data at 118. In an example implementation, the network reporting system can generate a graphical representation (e.g., a graphical visualization) based on these trend predictions and filtered network event data. For example, various graphs, charts, tables, reports, and/or alerts that illustrate and/or summarize these trend predictions and filtered network event data can be generated, such as further described below.

Figure 2:
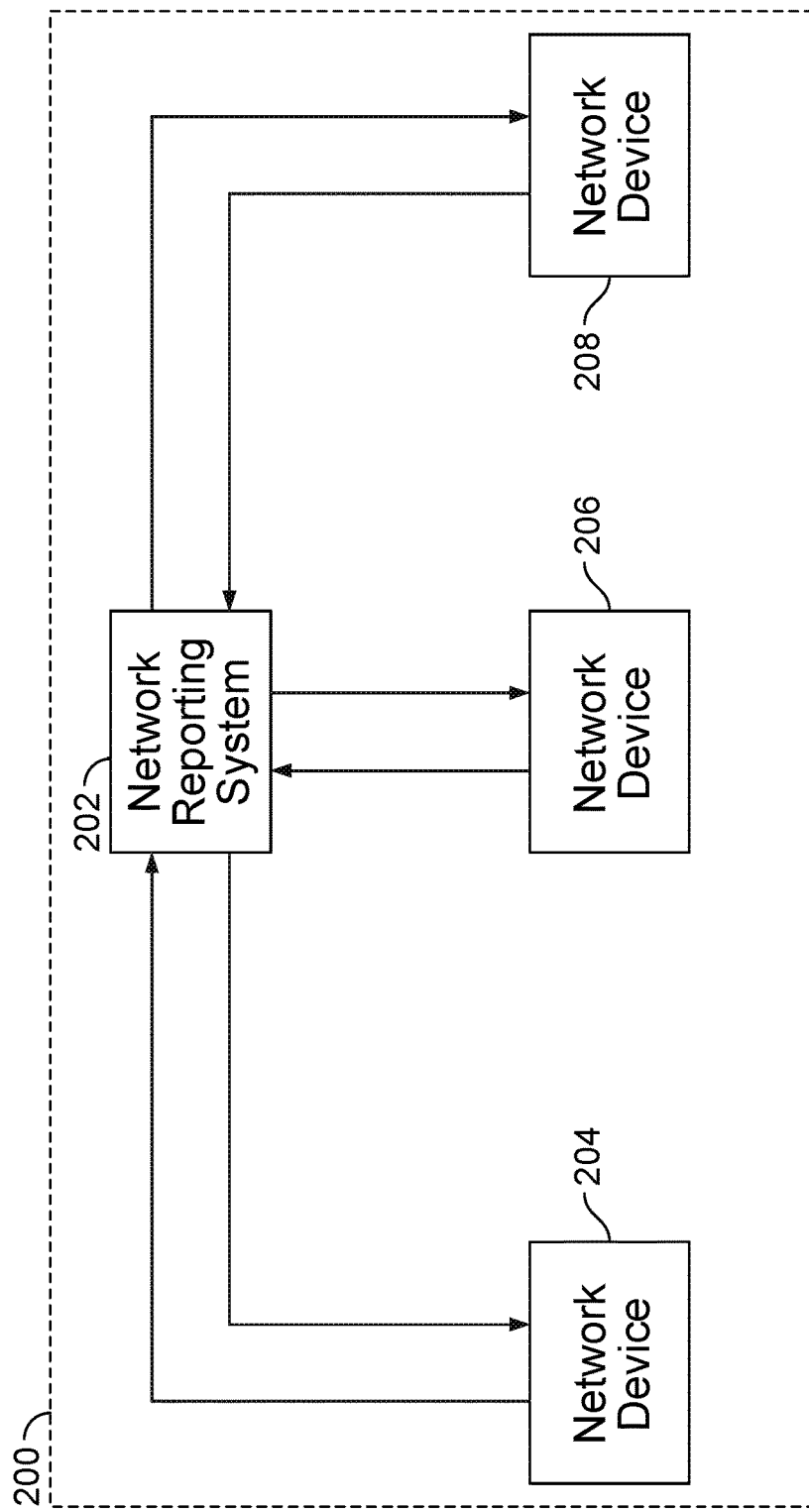
FIG. 2 is a functional block diagram of a network environment of a system for predictive analytics in network reporting using an EMM filter in accordance with some embodiments.

FIG. 2 is a functional block diagram of a network environment of a system for predictive analytics in network reporting using an EMM filter in accordance with some embodiments. As shown, a network 200 (e.g., an enterprise network) includes a network reporting system 202 (e.g., an application or component of the network reporting system, another network reporting system/application, and/or a network device, such as further described herein) that is in communication with network devices 204, 206, and 208. For example, network reporting system 202 can implement the activities described above with respect to FIG. 1. As such, the network devices can include DNS devices (e.g., DNS appliances/servers) and/or other physical/virtual network devices in the network (e.g., the enterprise network) that can monitor network events, which can be provided to and/or collected by network reporting system 202 (e.g., pushed and/or pulled monitored network event data collection, which can be pushed/pulled periodically or upon demand/request). For example, the network reporting system can communicate with the network devices to collect DNS response data as similarly described above with respect to FIG. 1 and further described below. In an example implementation, the network reporting system is implemented as an application or a component/plug-in executing on a network reporting platform, such as further described below. As would be apparent to one of ordinary skill in the art, the network 200 can include various other network devices, including virtual network devices or SDN devices (e.g., OpenFlow switches and/or other virtual/SDN devices).

Figure 3:
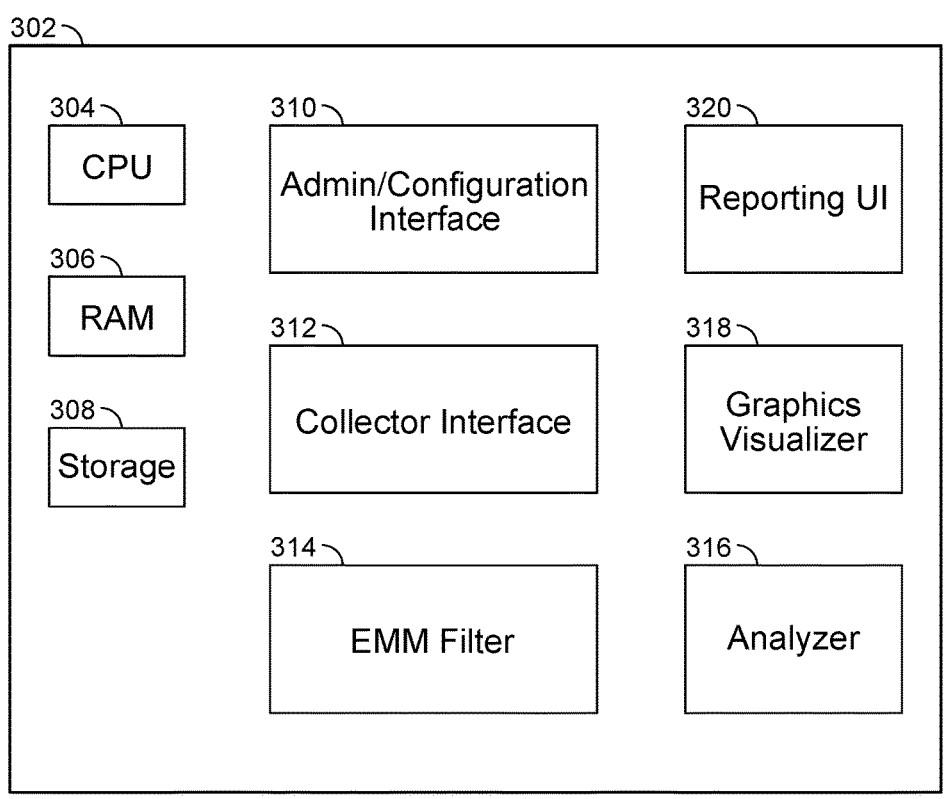
FIG. 3 is a functional block diagram of a system for predictive analytics in network reporting using an EMM filter in accordance with some embodiments.

FIG. 3 is a functional block diagram of a system for predictive analytics in network reporting using an EMM filter in accordance with some embodiments. As shown, system 302 includes a CPU 304, a RAM 306, and a data storage 308. In addition, system 302 includes various components for implementing various functions/services of the network reporting system as similarly described above with respect to FIGS. 1 and 2.

As shown, system 302 includes an admin/configuration interface 310. For example, the admin/configuration interface can provide a user interface (e.g., and, in some cases, a programmatic interface, such as through API(s), which can be used by an application/network application for accessing various functions/services provided by the network reporting system) for configuring the network reporting system to collect various network event data and/or to generate various graphical visualizations and/or reports based on the filtered and analyzed network event data, such as similarly described above and further described below.

As also shown, system 302 includes a collector interface 312. For example, the collector interface can collect endpoint interaction data from one or more collectors, such as DNS response data collected from a DNS device and/or SDN/virtual network devices such as OpenFlow switches, as similarly described above with respect to FIGS. 1 and 2. In an example implementation, the collector interface includes a controller (e.g., an SDN controller) for configuring and communicating with an SDN device(s) (e.g., an OpenFlow switch).

As also shown, system 302 includes an EMM filter 314. For example, the EMM filter can filter the collected network event data using various EMM filtering techniques disclosed herein. System 302 also includes an analyzer 316. For example, the analyzer can perform an analysis of the filtered network event data using various analytical techniques, such as to perform one or more trend prediction algorithms based on the filtered network event data, as similarly described above and further described below. In an example implementation, the analyzer can also include the EMM filter for filtering the collected network event data, as similarly described above and further described below. In another example implementation, the EMM filter is provided as a plug-in for the network reporting system for filtering the collected network event data, as similarly described above and further described below.

As also shown, system 302 includes a graphics visualizer 318. For example, the graphics visualizer can generate graphical representations, such as graphs, charts, and/or tables, of the filtered and analyzed network event data, as similarly described above and further described below. In an example implementation, the graphics visualizer is implemented using a commercially available or open source graphics package, such as the open source JavaScript library D3.js for graph visualization available at d3js.org, and/or using graphics visualization capabilities of commercially available network reporting tools.

As also shown, system 302 includes a reporting user interface (UI) 320. For example, the reporting UI can generate reports based on the filtered and analyzed network event data and/or graphical representations based on the filtered and analyzed network event data generated using graphics visualizer 318, as similarly described above and further described below. As an example, the reporting UI can be configured to generate alerts based on the filtered and analyzed network event data (e.g., based on default and/or customized configuration settings to generate alerts based on various events/thresholds associated with the filtered and analyzed network event data, such as if a trend prediction indicates that a network capacity/resource availability for usage of the enterprise network is predicted to be exceeded within a predetermined period of time, etc.), as similarly described above and further described below.

Each of these components is further described below with respect to various embodiments. In some implementations, one or more of these components can be performed by another device (e.g., another computing device, such as using a distributed computing architecture, a cloud-based service environment, and/or a virtualized computing environment) or component, such as the collector interface can be performed using another device or component. In some implementations, one or more of these components can be integrated, such as the EMM filter and analyzer component(s) can be implemented as an integrated component of the network application and/or platform (e.g., the EMM filter can be provided as a plug-in to a network reporting tool, such as further described below). In some implementations, a subset of these functions/components can be included in the network reporting system. In some implementations, additional components, such as a database (e.g., an in-memory database) for storing the collected network event data and for storing the filtered/analyzed collected network event data can be included in the network reporting system. In some implementations, one or more of these components can be implemented using programmed hardware (e.g., ASICs/FPGAs) and/or using combinations of computing hardware and software executed on the computing hardware (e.g., software executed on a computer (micro)processor).

For example, system 302 can implement the activities described above with respect to FIG. 1 and can also be used to implement and execute the network reporting system for the enterprise network as described above with respect to FIG. 2. For example, collected network event data can be processed using CPU 304 and RAM 306 and stored in storage 308.

In an example implementation, the network reporting system can be executed on commercial off-the-shelf (COTS) hardware (e.g., server class hardware or, in some cases, a laptop or desktop computer). In this example implementation, the network reporting system is easy to deploy, requiring very little change to existing network infrastructure (e.g., of an enterprise network on which the network reporting system can be deployed for monitoring and analyzing network event data, such as further described below).

In another example implementation, as will be apparent to those of ordinary skill in the art, the various techniques disclosed herein for filtering and analyzing the collected network event data can also be implemented using separate systems, such as Hadoop or Spark for analytics, and feeding the data collected by a separate mechanism.

Figure 4:
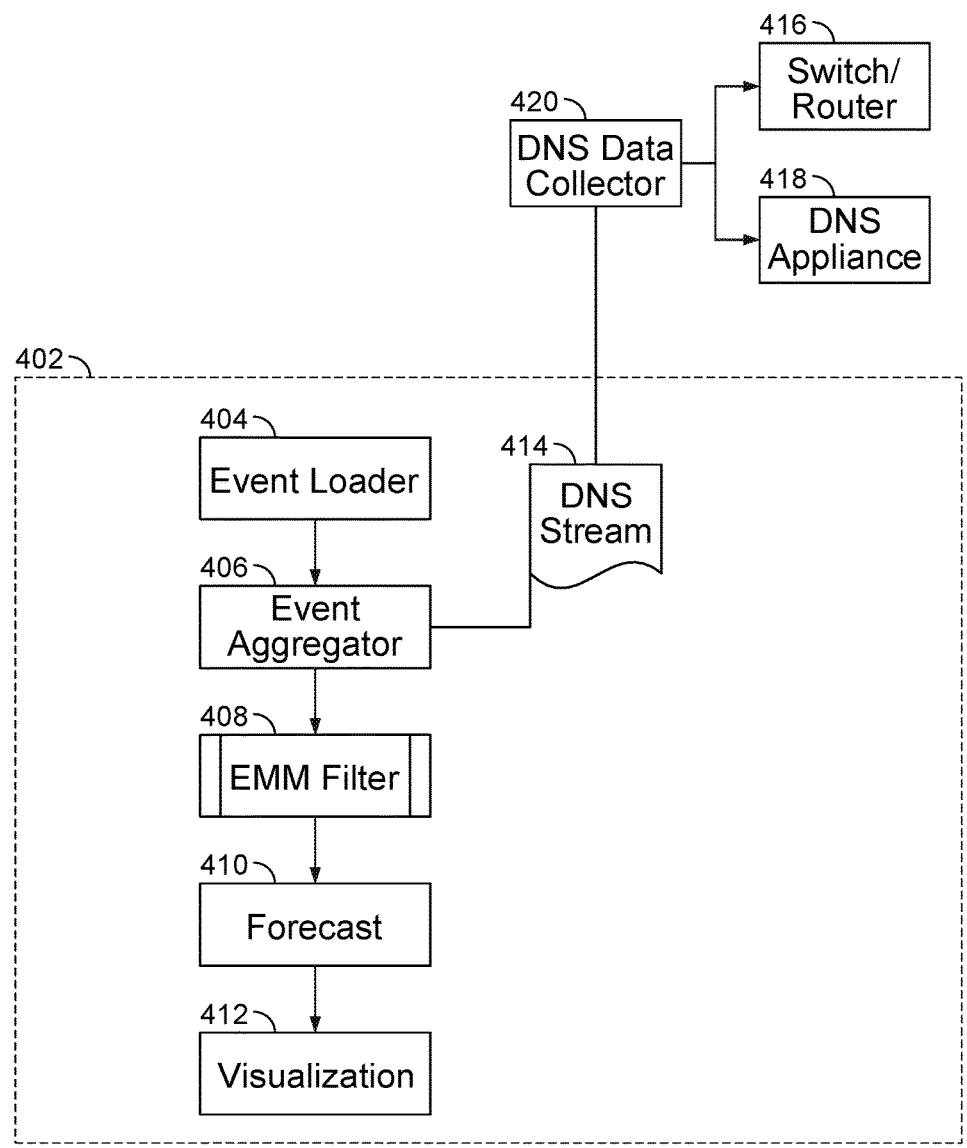
FIG. 4 is a structural unified modeling language (UML) diagram of a network reporting tool for predictive analytics in network reporting using EMM filtering in accordance with some embodiments.

FIG. 4 is a structural unified modeling language (UML) diagram of a network reporting tool for predictive analytics in network reporting using EMM filtering in accordance with some embodiments. In one embodiment, a network reporting tool 402 provides the functions/services of the network reporting system as similarly described above with respect to FIGS. 1-3.

Referring to FIG. 4, a DNS data collector 420 collects DNS-related network event data (e.g., DNS response data and/or other DNS-related network event data) from a switch/router 416 and a DNS appliance 418. DNS data collector 420 provides the collected DNS-related network event data to DNS stream 414 of network reporting tool 402. As also shown, network reporting tool 402 includes an event loader 404. Event loader 404 can be configured to load collected network event data, such as collected DNS-related network event data, which is aggregated by an event aggregator 406. The aggregated event data is filtered using EMM filter 408. The filtered event data is analyzed for trends prediction using a forecast component 410. The filtered and analyzed event data is presented for graphical representation using a visualization component 412.

In an example implementation, the event loader, event aggregator, and visualization components can be provided using commercially available network reporting tools/platforms (e.g., such as the Infoblox Reporting solutions/appliances commercially available from Infoblox Inc. and/or other network reporting related products/services from other vendors, such as other network reporting platforms available from Splunk Corporation and/or similar network reporting platforms available from other vendors or open source projects). Example implementations of the EMM and forecast components are further described below.

Techniques for Providing an Exponential Moving Maximum (EMM) Filter for Predictive Analytics for Network Reporting As similarly described above, tools exist for performing trend prediction or forecasting on time series data. Many of the existing approaches adopt some type of moving average techniques for extracting trends with removal of so-called non-stationarity or noise. For example, an AutoRegressive Integrated Moving Average (ARIMA) model is a commonly used approach (e.g., a description of the ARIMA model is provided by Asteriou, Dimitros, Hall, Stephen G. (2011), "ARIMA Models and the Box—Jenkins Methodology," Applied Econometrics (Second Edition). Palgrave MacMillan, pp. 265-286).

Figure 5A:
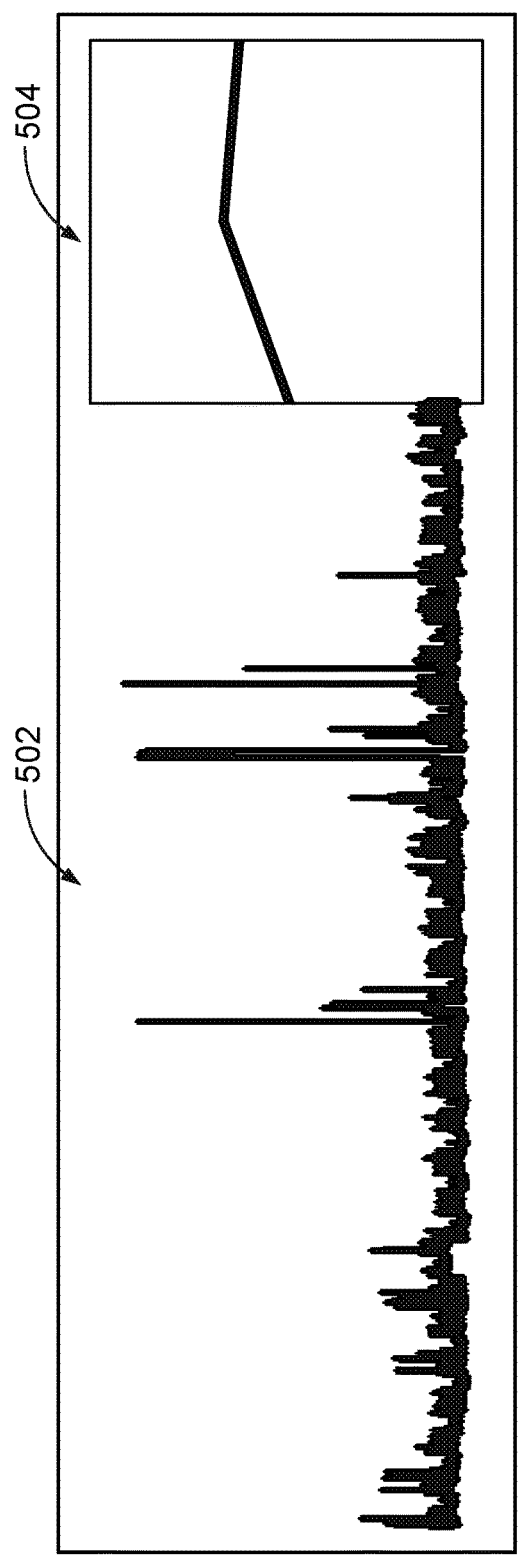
FIG. 5A is a chart illustrating an example trend prediction based on time series data.

FIG. 5A is a chart illustrating an example trend prediction based on time series data. Time series data generated by a network service system, such as DNS/DHCP data from DNS and DHCP servers/appliances, often includes useful non-stationarity. An example of such non-stationarity is illustrated in the time series data shown at 502 of FIG. 5A. Specifically, the time series data shown at 502 is time series DNS query data with hourly maximum or peak values for a period of 200 days.

In many cases, users (e.g., IT/network admins/managers) are interested in identifying a trend of peak value data and, furthermore, to determine a prediction based on that trend (e.g., a prediction for a future trend based on the current and/or historical time series data). For example, a trend prediction/forecast for the DNS query data with hourly maximum/peak values can be applied by an IT/network admin/manager to determine whether the DNS network servers/appliances can support the future DNS services demand for the enterprise network or whether additional DNS appliances/servers should be deployed on the enterprise network to support the future DNS services demand based on the trend prediction/forecast (e.g., DNS servers/appliances deployed on an enterprise network generally should be able to handle peak load for DNS query traffic, as further discussed below). Therefore, users can have means to assess the capacities of network equipment because the purchase and deployment will take a long time.

Referring to FIG. 5A, when a traditional prediction algorithm is applied to the time series data, the information about the local maximums (e.g., peak values) is smoothed out. Specifically, an example that is the result of prediction provided by applying the Splunk predict method (e.g., available from Splunk Corporation, see www.splunk.com, in which the Splunk predict method implements, for example, a linear model and/or a seasonal model with a known period) is shown at 504 of FIG. 5A. Due to the nature of naive prediction algorithms, local maximums are smoothed out from the historical time series data as shown in this example.

For example, DNS servers/appliances in an IT data center (e.g., deployed on an enterprise network) generally should be able to handle peak load for DNS query traffic. As such, smoothing of time series data for DNS query traffic that eliminates local peaks is undesirable as such does not facilitate accurate trend predictions that generally should identify such peaks (e.g., for IT data center capacity resource usage and planning such as for DNS servers/appliances). As such, techniques for providing an EMM filter for predictive analytics for network reporting are disclosed, as further described below.

FIG. 5B shows charts illustrating an example of EMM filtering applied to time series data for DNS queries and trend prediction performed on the EMM filtered time series data in accordance with some embodiments. As shown, a chart for DNS queries at 510 provides an example of EMM filtering performed over the hourly peak DNS query time series data using the disclosed EMM filtering techniques. For example, the peak values that are local maximums can become bubble points that over shadow the following non-local maximal data points. As similarly discussed above, a trend prediction for the DNS query data can be performed on the EMM filtered (e.g., smoothed) time series data. In an example implementation, a Splunk built-in feature for performing trend prediction can be applied to the EMM filtered time series data shown at 520 (e.g., which corresponds to the time series data and EMM filtered data as shown at 510), and the result that has EMM filtering applied before performing the trend prediction is illustrated at 522 of FIG. 5B. As shown, applying the trend prediction to the EMM filtered data accounts for more influence of the local maximums in the trend prediction than the previous experiment that does not have EMM filtering prior to applying the trend prediction as shown in FIG. 5A.

Figure 6:
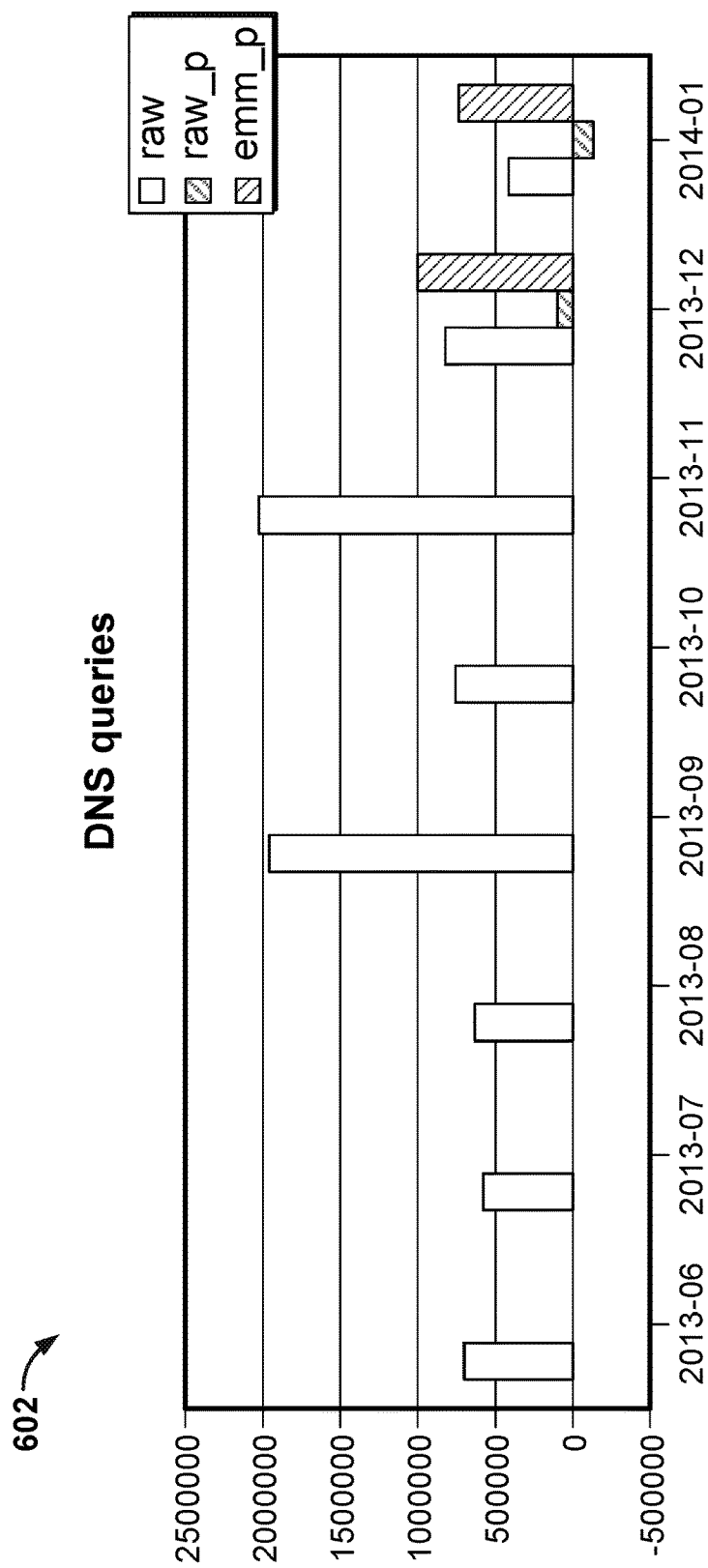
FIG. 6 is a chart illustrating an example based on time series data for DNS queries that shows results for trend prediction performed without an EMM filter and with an EMM filter in accordance with some embodiments.

FIG. 6 is a chart illustrating an example based on time series data for DNS queries that shows results for trend prediction performed without an EMM filter and with an EMM filter in accordance with some embodiments. As shown, a chart for DNS queries at 602 provides an example based on time series data for DNS queries (e.g., DNS queries for every ten minutes) that illustrates different results for trend prediction performed without an EMM filter (e.g., using the Splunk predict method as similarly described above) and with an EMM filter (e.g., using the disclosed EMM filtering techniques).

Figure 7:
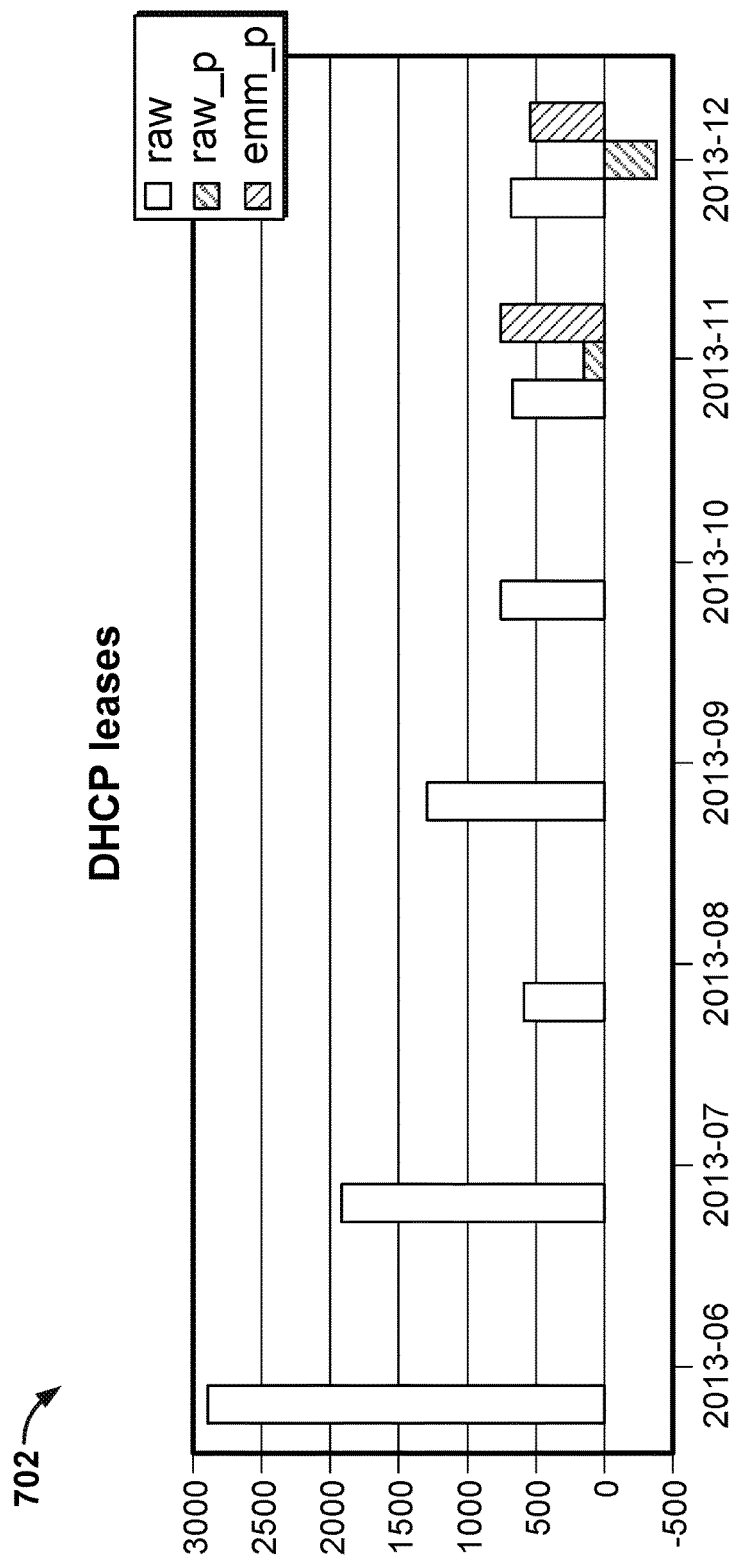
FIG. 7 is a chart illustrating an example based on time series data for DHCP leases that shows results for trend prediction performed without an EMM filter and with an EMM filter in accordance with some embodiments.

FIG. 7 is a chart illustrating an example based on time series data for DHCP leases that shows results for trend prediction performed without an EMM filter and with an EMM filter in accordance with some embodiments. As shown, a chart for DHCP leases at 702 provides an example based on time series data for DHCP leases (e.g., DHCP leases for every one minute) that illustrates different results for trend prediction performed without an EMM filter (e.g., using the Splunk predict method as similarly described above) and with an EMM filter (e.g., using the disclosed EMM filtering techniques).

As such, techniques for providing an EMM filter for predictive analytics for network reporting are disclosed, as further described below. In one embodiment, an EMM filter aggregates historical values (e.g., of a set of time series data associated with a data center/enterprise network, which can be applied for network reporting, such as similarly described herein) with a maximum aggregator so that the historical values can contribute to their following values with an impact that decays exponentially with time.

In one embodiment, the EMM filter can be defined as follows:

$$y_k = \max_{0 \le i \le k} \{\alpha^{\frac{i}{w}} x_{k-i}\}$$

where $$\alpha \in [0, 1.0]$$

is an inheritance parameter and w is a filtering window size.

In the case, when $$\alpha = 0, y_k = x_k$$

and when $$\alpha = 1,$$

$$y_k = \max_{0 \le i \le k} \{x_i\}.$$

If $$y_k = \alpha^{\frac{m}{w}} x_{k-m},$$

then $x_{k-m}$ is called the bubble point of $y_k$ and m is the bubble distance.

Figure 8:
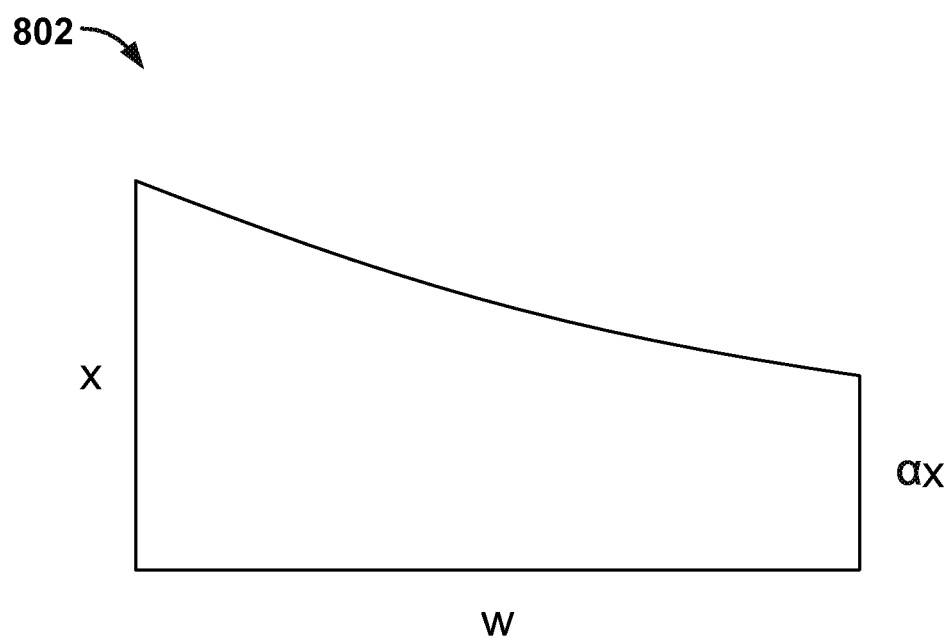
FIG. 8 is a diagram illustrating a relationship of the EMM filter parameters in accordance with some embodiments.

FIG. 8 is a diagram illustrating a relationship of the EMM filter parameters in accordance with some embodiments. Specifically, diagram 802 of FIG. 8 illustrates the relationship of the parameters of the EMM filter in which the original value x will have a contribution of the magnitude of αx for the filtered value at a future position that is w distance away from x.

For example, in the above-described embodiment of the EMM filter, it can be proven that $$\begin{aligned}
y_k &= \max_{0 \le i \le k} \{\alpha^{\frac{i}{w}} x_{k-i}\} \\
&= \max(x_k, \alpha^{\frac{1}{w}} x_{k-1}, \alpha^{\frac{2}{w}} x_{k-2}, \ldots, \alpha^{\frac{k}{w}} x_0) \\
&= \max[x_k, \alpha^{\frac{1}{w}} (x_{k-1}, \alpha^{\frac{1}{w}} x_{k-2}, \ldots, \alpha^{\frac{k-1}{w}} x_0)] \\
&= \max(x_k, \alpha^{\frac{1}{w}} \max_{0 \le i \le k-1} \{\alpha^{\frac{i}{w}} x_{k-1-i}\}) \\
&= \max(x_k, \alpha^{\frac{1}{w}} y_{k-1}).
\end{aligned}$$

As such, this is the EMM representation in a recursive format that simplifies memory complexity to O(1) for implementation.

In one embodiment, trend prediction is performed on time series data (e.g., DNS/DHCP or other network-related time series data) that has been smoothed using the EMM filter. In an example implementation, the trend prediction is performed using the Splunk built-in trend prediction feature as similarly described above. For example, the Splunk built-in trend prediction feature includes an easy to use user interface and Software Development Kit (SDK) for customization. As would be apparent to one of ordinary skill in the art, various other commercially available, open source, or custom implemented trend prediction products/packages can be used to perform the disclosed EMM filtering applied to various network-related time series data using different prediction algorithms/implementations.

In one embodiment, the EMM filter is provided as a plug-in to a network reporting platform. For example, Splunk provides an SDK for users to develop custom commands as plug-ins to the Splunk network reporting platform.

In an example implementation, a custom command named "emm" is developed in Python (e.g., or another programming language can be similarly used to implement the EMM filter as a plug-in) and plugged into the Splunk platform as a plug-in. In this example implementation, the syntax of the custom command named "emm" is as follows.

emm <variable_to_predict> [inheritance=i] [window=w]

where i is a floating point value between 0 and 1.0 to represent α and w is an integer value equivalent to the timespan. For instance, for hourly time series data, w=720 has a window size of one month.

In one embodiment, the native Splunk command "predict" (e.g., the built-in Splunk predict function) is customized into a new command "forecast" as similarly described above. In this example implementation, the syntax of the custom command named "forecast" is as follows.

forecast <variable_to_predict> [AS <newfield_name>] [<forecast_option>]

The "forecast_option" is similar to the options for the command "predict" except for some fields that have different default values customized.

Figure 9:
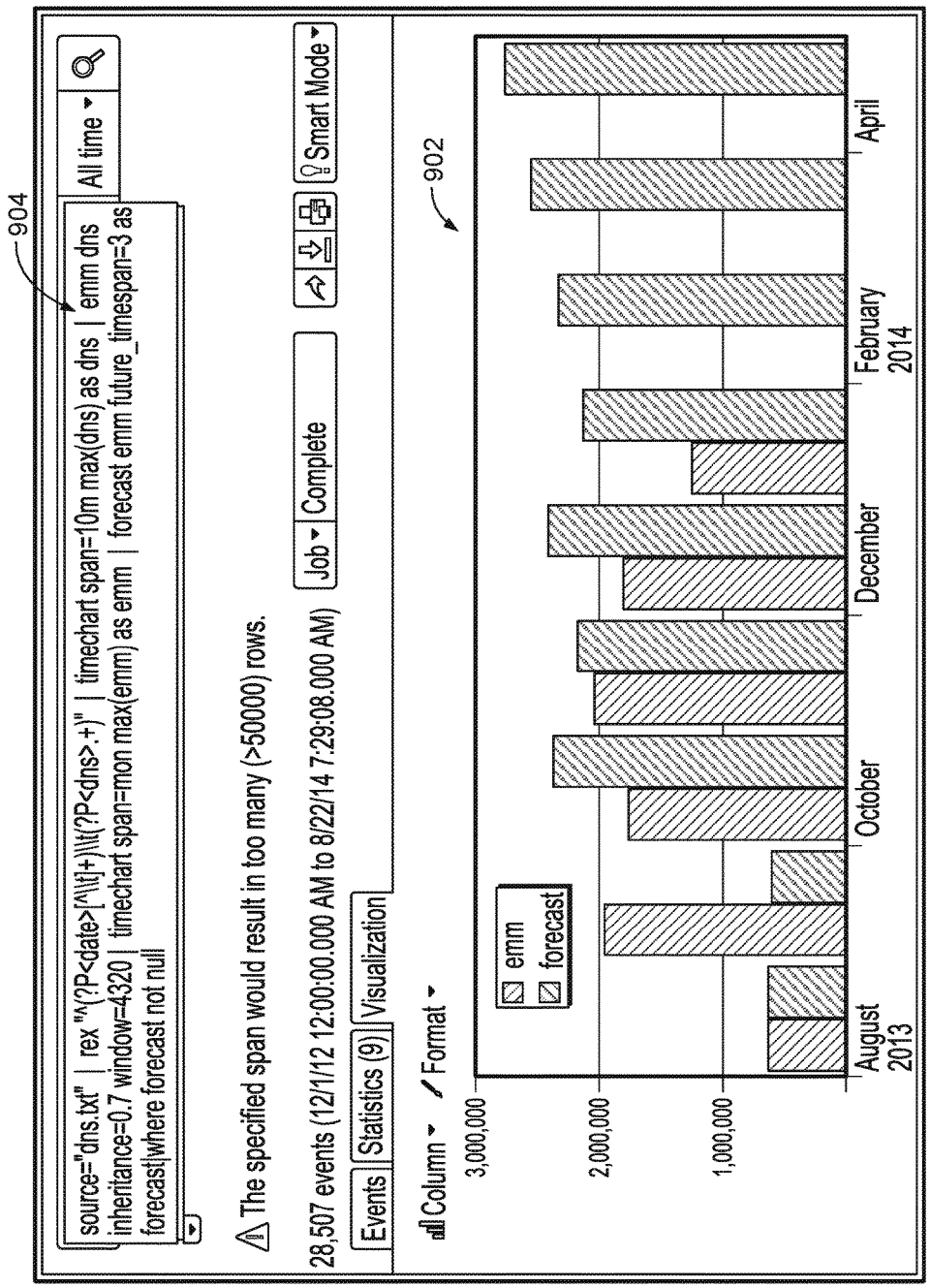
FIG. 9 is an example screen shot illustrating a trend prediction with an EMM plug-in in accordance with some embodiments.

FIG. 9 is an example screen shot illustrating a trend prediction with an EMM plug-in in accordance with some embodiments. In one embodiment, the EMM filter is provided as a plug-in to a network reporting platform. For example, Splunk provides an SDK for users to develop custom commands as plug-ins to the Splunk network reporting platform, such as similarly described above and further described below.

In an example implementation, such as similarly described above with respect to FIG. 4, the EMM filter as shown at 408 of FIG. 4 and the forecast function as shown at 410 of FIG. 4 can be implemented as custom commands to the Splunk platform (e.g., the EMM filter can be implemented as a plug-in for the Splunk network reporting application/platform, and the forecast function can be a customized implementation of the Splunk predict function such as for enhanced post-processing, which can enhance prediction capabilities and generate more accurate predictions based on current/historical data for network reporting, such as further described below). In this example implementation, the prediction process with EMM filtering can be pipelined similar to most of the Splunk queries. An example of the sequence for the prediction process is shown in FIG. 4, in which event data files are loaded into the Splunk platform at 404 of FIG. 4, a query is submitted to start the prediction process, and the query starts from event aggregation with use of the Splunk aggregation functions as shown at 406 of FIG. 4.

A sample query command pipe in Splunk is given as follows.

source="dns.txt"|rex "^(?P<date>[^\\t]+)\\t(?P<dns>.+)"|timechart span=10 m max(dns) as dns|emm dns inheritance=0.7 window=4320|timechart span=mon max (emm) as emm|forecast emm future_timespan=3

EMM filtering is then performed on aggregated time series data (e.g., DNS stream 414) at 408 of FIG. 4 (e.g., to further aggregate EMM output into a coarse level desired by the prediction objective). At 410 of FIG. 4, a custom forecast command is executed to generate a prediction result (e.g., a trend prediction based on the EMM filtered time series data).

At 412 of FIG. 4, a graphic visualization of the prediction result is generated using Splunk visualization functions. The screen shot of FIG. 9 illustrates the output of the Splunk prediction with an EMM plug-in in this example implementation. As shown, the screen shot provides a visualization of the EMM filtered historical/current time series data and the forecast based on the EMM filtered historical/current time series data as shown in the chart at 902. As also shown, the query command pipe in Splunk is shown at 904.

Figure 10:
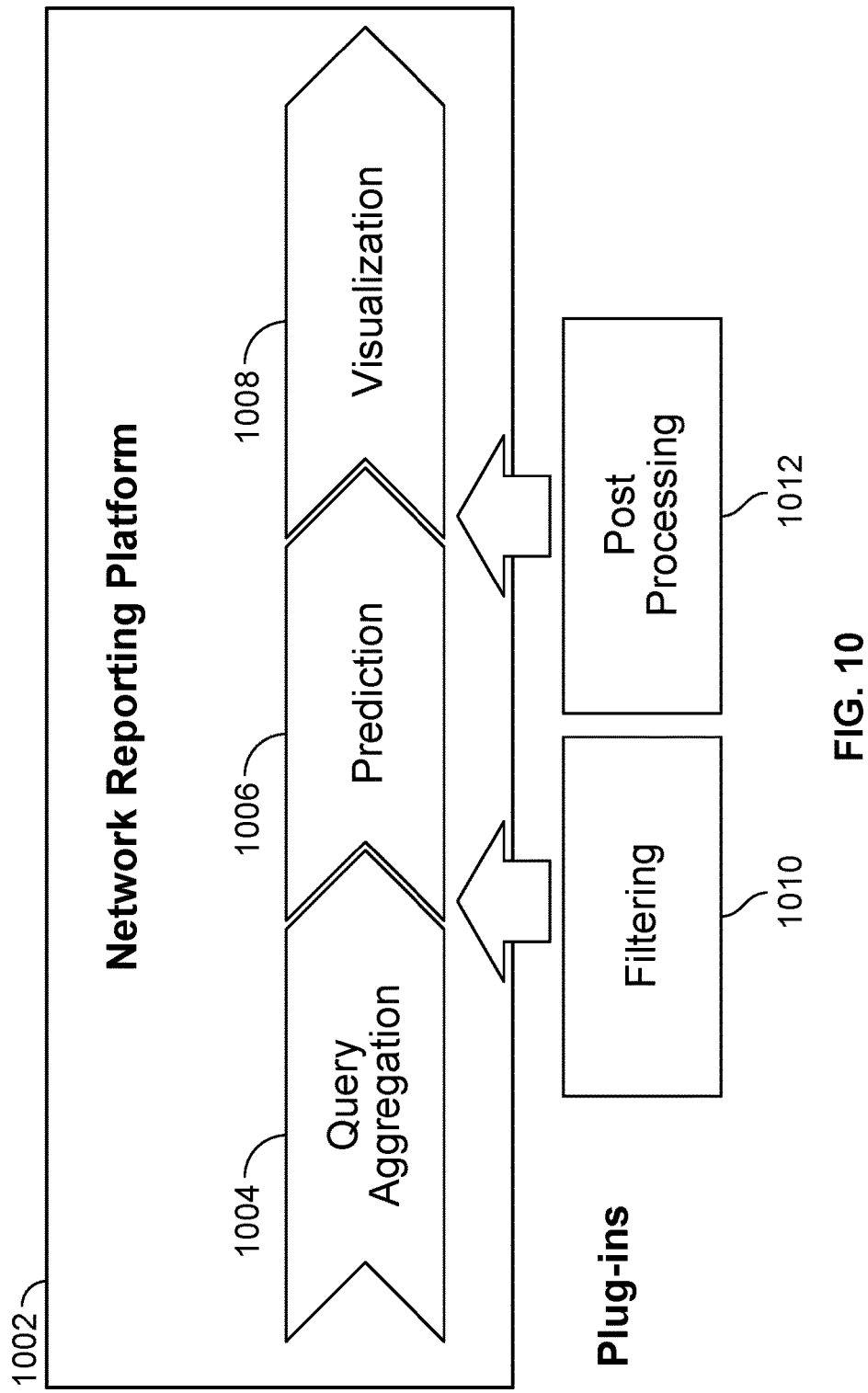
FIG. 10 is a diagram illustrating an architecture for providing a trend prediction with plug-ins for a network reporting platform in accordance with some embodiments.

FIG. 10 is a diagram illustrating an architecture for providing a trend prediction with plug-ins for a network reporting platform in accordance with some embodiments. In one embodiment, the EMM filter is provided as a plug-in to a network reporting platform (e.g., the commercially available Splunk platform or another network reporting platform that supports plug-ins). For example, the Splunk platform is a commercially available network reporting platform that provides an SDK for users to develop custom commands as plug-ins to the Splunk network reporting platform that enhance trend prediction capabilities and provide more accurate trend predictions for network reporting, such as similarly described above and further described below.

Referring to FIG. 10, a network reporting platform 1002 (e.g., the commercially available Splunk platform or another network reporting platform that similarly supports plug-ins) includes a query aggregation component 1004. For example, the query aggregation component can perform event loader 404 and event aggregator 406 functions as similarly described above with respect to FIG. 4. A filter plug-in 1010 is provided as a plug-in to the network reporting platform as shown. For example, the filter plug-in can perform EMM filter 408 functions as similarly described above with respect to FIG. 4. An example implementation of such an EMM filter plug-in is further described below.

Example pseudo code for an EMM filter plug-in is shown below.

```
Set p = a^(1/w), where a is the inheritance parameter and w is the
window size given by user.
For each data point x in the input sequence,
    If x is the first data point
        Output y = x.
    Else
        Output y = max(x, pL).
    Set L = y.
Done.
```

As also shown, network reporting platform 1002 (e.g., the commercially available Splunk platform or another network reporting platform that similarly supports plug-ins) includes a prediction component 1006. For example, the prediction component can perform the Splunk predict function as similarly described above. A post-processing plug-in 1012 is provided as a plug-in to the network reporting platform as shown.

In an example implementation, a forecast function can be provided as a customized implementation of the Splunk predict function that can be implemented as a plug-in for the Splunk platform. For example, prediction component 1006 and post-processing plug-in 1012 can perform forecast 410 functions as similarly described above with respect to FIG. 4. An example implementation of such a post-processing plug-in is further described below.

Example pseudo code for a post-processing plug-in is shown below.

```
For each data point x in the input sequence,
    If x is less than zero
        Output y = 0.
    Else
        Output y = x.
Done.
```

As also shown, network reporting platform 1002 (e.g., the commercially available Splunk platform or another network reporting platform that similarly supports plug-ins) includes a visualization component 1008. For example, the visualization component can perform visualization 412 functions as similarly described above with respect to FIG. 4.

In an example implementation, the filtering plug-in and/or the post-processing plug-in are programmed using the Python programming language (e.g., and/or another programming/scripting language). For example, the filtering plug-in and/or the post-processing plug-in can be provided as commercially available plug-ins and/or open source plug-ins for one or more network reporting platforms.

In another example implementation, the filtering and/or post-processing components can be integrated with various other network reporting platforms using an application programming interface(s) (API(s)), such as restful API(s) that facilitate third party integration. In yet another example implementation, the filtering and/or post-processing components can be integrated natively by a network reporting application/platform. In yet another example implementation, the filtering and/or post-processing components can be integrated in other network reporting tools, such as third party libraries (e.g., R: Predict method for Linear Model Fits; Mahout: linear regression; Matlab: Parametric Trend Estimation; Python: statistics library; Ipredict: Q-Forecasting; and/or other third party libraries).

Figure 11:
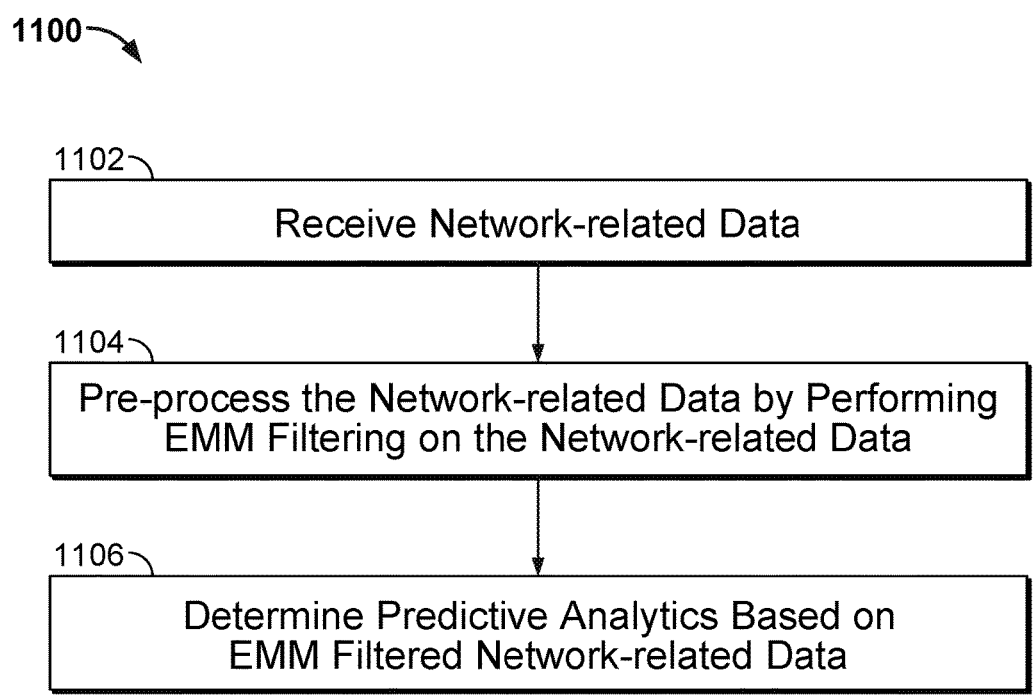
FIG. 11 is a flow diagram illustrating a process for predictive analytics in network reporting using an EMM filter in accordance with some embodiments.

FIG. 11 is a flow diagram illustrating a process for predictive analytics in network reporting using an EMM filter in accordance with some embodiments. In some embodiments, the process 1100 is performed by a network reporting application/platform (e.g., executed a processor and using a memory), such as described above with respect to FIGS. 1-4 and 10.

At 1102, network-related data is received. For example, the network-related data can include monitored network events data, such as DNS data (e.g., DNS query and DNS response data).

At 1104, pre-processing the network-related data by performing EMM filtering on the network-related data is performed. In an example implementation, EMM filtering is implemented by an EMM filter plug-in for the network reporting platform, such as similarly described above.

At 1106, predictive analytics are determined based on the EMM filtered network-related data. For example, a trend prediction can be generated based on the EMM filtered network-related data, such as similarly described above.

Figure 12:
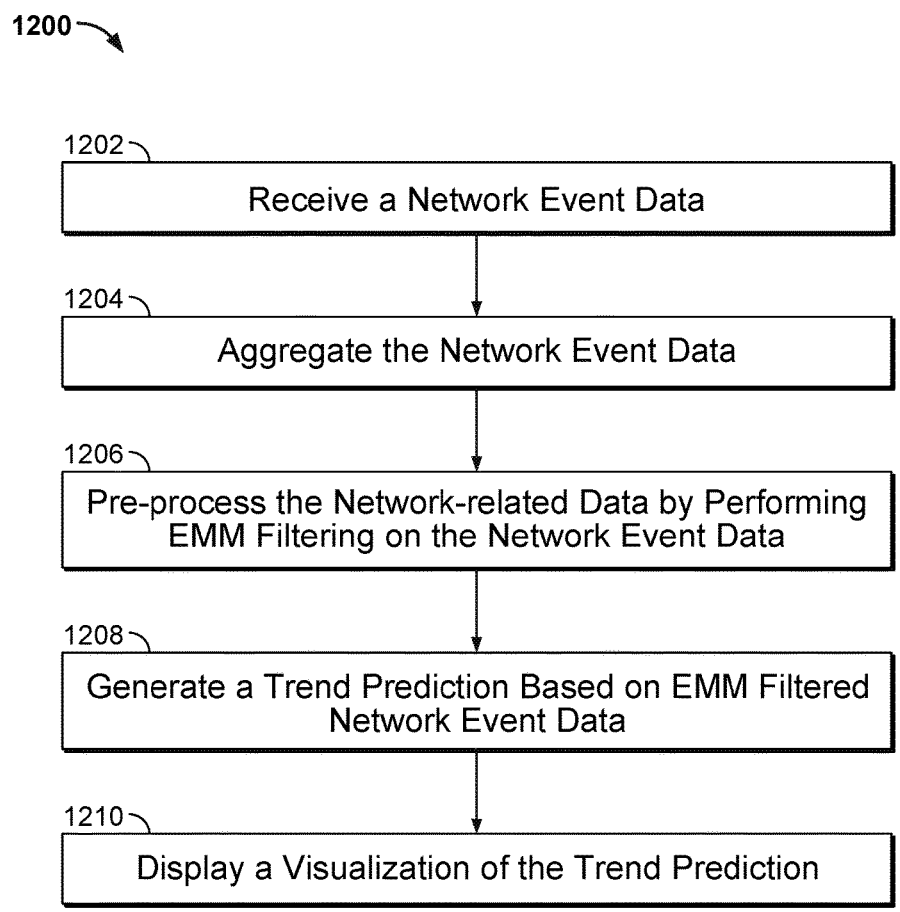
FIG. 12 is another flow diagram illustrating a process for predictive analytics in network reporting using an EMM filter in accordance with some embodiments.

FIG. 12 is another flow diagram illustrating a process for predictive analytics in network reporting using an EMM filter in accordance with some embodiments. In some embodiments, the process 1200 is performed by a network reporting application/platform (e.g., executed a processor and using a memory), such as described above with respect to FIGS. 1-4 and 10.

At 1202, network event data is received. For example, the network event data can include monitored network events data, such as DNS data (e.g., DNS query and DNS response data). In an example implementation, DNS data can be collected from network devices, which can include physical network devices (e.g., DNS servers/appliances), virtual network devices, and/or software-defined networking (SDN) devices (e.g., OpenFlow switches).

At 1204, the network event data is aggregated. For example, the network event data can be aggregated using an event aggregator (406), such as similarly described above with respect to FIG. 4.

At 1206, pre-processing the network event data by performing EMM filtering on the network event data is performed. In an example implementation, EMM filtering is implemented by an EMM filter plug-in for the network reporting platform, such as similarly described above.

At 1208, a trend prediction is generated based on the EMM filtered network event data. For example, the trend prediction can be generated using a forecast component (410), such as similarly described above with respect to FIG. 4.

At 1210, a visualization is generated based on the trend prediction. For example, the visualization (e.g., graph, chart, report, etc.) can be generated using a visualization component (412), such as similarly described above with respect to FIG. 4.

For example, the visualization of the trend prediction can provide new insights to a network operator/admin. As such, the network reporting application/platform is a tool for a network operator/admin that provides new and improved techniques for trend prediction for certain types of network event types of data as similarly described above. For instance, the disclosed enhanced trend prediction techniques for network reporting can be applied to facilitate network capacity planning, such as similarly described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for predictive analytics in network reporting, comprising:
   a processor configured to:
      pre-process network-related data by performing exponential moving maximum (EMM) filtering on the network-related data, comprising to:
         aggregate a number of transactions per a period of time of network events over a plurality of periods of time to obtain the network-related data; and
         perform the EMM filtering on the network-related data; and
      determine predictive analytics based on the EMM filtered network-related data, comprising to:
         adjust a network capacity of a network based on the determined predictive analytics; and
   a memory coupled to the processor and configured to provide the processor with instructions.

2. The system recited in claim 1, wherein the network-related data includes monitored network events data.

3. The system recited in claim 1, wherein the network-related data includes Domain Name System (DNS) data.

4. The system recited in claim 1, wherein the network-related data includes Domain Name System (DNS) query and DNS response data.

5. The system recited in claim 1, wherein to determine predictive analytics based on the EMM filtered network-related data includes to:
generate a trend prediction based on the EMM filtered network-related data.

6. The system recited in claim 1, wherein the processor is further configured to:
generate a trend prediction based on the EMM filtered network-related data; and
generate a visualization of the trend prediction for display.

7. The system recited in claim 1, wherein the processor is further configured to:
receive network-related data.

8. The system recited in claim 1, wherein the processor is further configured to:
receive Domain Name System (DNS) data that is collected from an agent executed on a DNS appliance.

9. The system recited in claim 1, wherein the processor is further configured to:
collect network-related data from one or more network devices.

10. The system recited in claim 1, wherein the processor is further configured to:
collect network-related data from one or more network devices; and
store the network-related data in a data store.

11. A method of predictive analytics in network reporting, comprising:
pre-processing network-related data by performing exponential moving maximum (EMM) filtering on the network-related data, comprising:
aggregating a number of transactions per a period of time of network events over a plurality of periods of time to obtain the network-related data; and
performing the EMM filtering on the network-related data; and
determining predictive analytics based on the EMM filtered network-related data, comprising:
adjusting a network capacity of a network based on the determined predictive analytics.

12. The method of claim 11, wherein the network-related data includes monitored network events data.

13. The method of claim 11, wherein the network-related data includes Domain Name System (DNS) data.

14. The method of claim 11, wherein the network-related data includes Domain Name System (DNS) query and DNS response data.

15. The method of claim 11, further comprising:
generating a trend prediction based on the EMM filtered network-related data; and
generating a visualization of the trend prediction for display.

16. A computer program product for predictive analytics in network reporting, the computer program product being embodied in a tangible non-transitory computer readable storage medium and comprising computer instructions for:
pre-processing network-related data by performing exponential moving maximum (EMM) filtering on the network-related data, comprising:
aggregating a number of transactions per a period of time of network events over a plurality of periods of time to obtain the network-related data; and
performing the EMM filtering on the network-related data; and
determining predictive analytics based on the EMM filtered network-related data, comprising:
adjusting a network capacity of a network based on the determined predictive analytics.

17. The computer program product recited in claim 16, wherein the network-related data includes monitored network events data.

18. The computer program product recited in claim 16, wherein the network-related data includes Domain Name System (DNS) data.

19. The computer program product recited in claim 16, wherein the network-related data includes Domain Name System (DNS) query and DNS response data.

20. The computer program product recited in claim 16, further comprising computer instructions for:
generating a trend prediction based on the EMM filtered network-related data; and generating a visualization of the trend prediction for display.

\* \* \* \* \*